(No Model.)
C. M. ARTHUR.
SALT TROUGH.
No. 532,015.　　　　　　　　Patented Jan. 8, 1895.
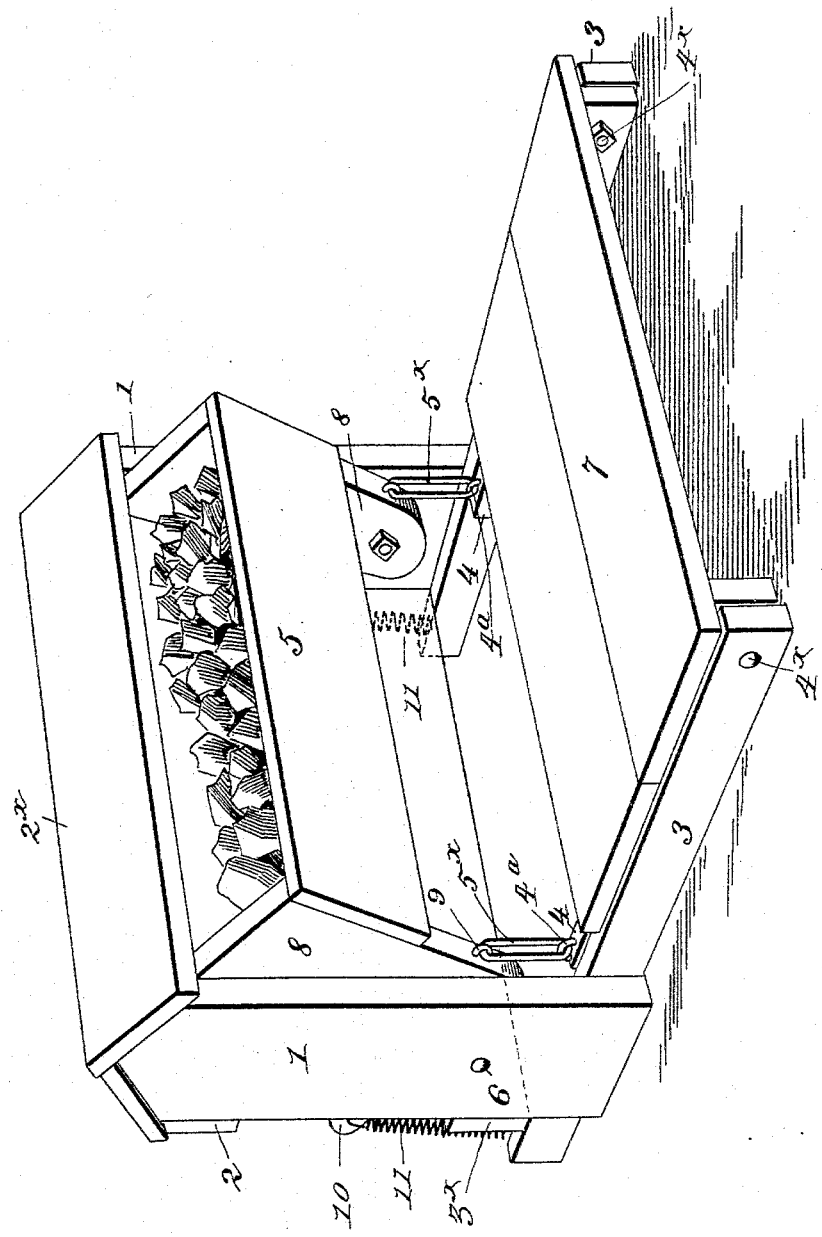
Witnesses:
H. J. Barber
W. C. Heaston
Inventor:
Christopher M. Arthur

UNITED STATES PATENT OFFICE.

CHRISTOPHER M. ARTHUR, OF NEAR BETHANY, MISSOURI.

SALT-TROUGH.

SPECIFICATION forming part of Letters Patent No. 532,015, dated January 8, 1895.

Application filed August 1, 1893. Serial No. 482,133. (No model.)

*To all whom it may concern:*

Be it known that I, CHRISTOPHER M. ARTHUR, a citizen of the United States, residing near Bethany, in the county of Harrison, State of Missouri, have invented certain new and useful Improvements in Salt-Troughs; and I do hereby declare the following to be a full, clear, and exact description of the invention, such as will enable others skilled in the art to which it pertains to make and use the same.

This invention relates to salt troughs and has for its object to provide a device of the character set forth, which is so adjusted that the weight of the animal will cause it to tilt forward in the proper position to expose the contents, and when the weight is removed from the platform the box containing the salt or other material will be pulled back under cover in an upright position.

A further object of the invention is to provide a cheap and economical salt trough which is noiseless in its operation and wherein the contents of the box or trough will be protected from the elements when not in use, and thereby prevent the several parts from getting out of working order.

With these and other objects in view the invention consists of the construction and arrangement of the several parts, which will be more fully hereinafter described and claimed.

The accompanying drawing represents a perspective view of a salt trough embodying the invention.

In the drawing the numeral 1 designates opposite side pieces or uprights having a rear upper cross strip 2 and a roof or cover $2^x$. Secured to the lower inner portions of the opposite side pieces or uprights 1 are sills 3 which project a greater distance toward the front than from the rear of the said side pieces or uprights, and extending from one sill to the other and bearing against the rear edges of the said pieces or uprights is a cross brace $3^x$. Along the inner opposing sides of the sills 3 are mounted operating beams 4 which have their upper edges extending above the level of the upper edges of the said sills 3 and are pivoted to the latter adjacent to their front ends by bolts $4^x$, the rear ends of said operating beams being free to have movement on the said bolts $4^x$ which serve as fulcrums. On the operating beams 4 is secured a platform 7 upon which the animal stands in feeding from the trough. The rear upper portions of the operating beams are supplied with staples $4^a$ to which are pivotally attached links $5^x$. Between the opposite side pieces or uprights 1 is pivotally mounted a trough or feeding box 5 having the opposite side pieces 8 depending below the bottom of the same and pivotally attached to said side pieces or uprights by bolts 6. To the front edges of the said depending portions of the side pieces 8 are attached staples 9 to which the upper portions of the links $5^x$ are pivotally secured. The rear portion of the box or trough is supplied with ears 10 to which the upper parts of springs 11 are connected, the lower ends of said springs being secured to the rear portions of the sills 3, and it is intended that the said springs may be adjusted to or from the rear ends of the sills 3 to compensate for the variation of weight of the box or trough 5 in order to render the normal position of said box or trough closed or under the roof or cover $2^x$.

In operation, the animal steps upon the platform 7 and depresses the beams 4, which drawing down upon the links $5^x$ pull the trough or box outward in the position shown, against the retractile action of the springs 11, and thereby the contents of the said box or trough are exposed. When the animal moves from the platform 7, the springs 11 come into play and throw the box or trough backward under the cover or roof $2^x$, thereby protecting the contents of the same.

It will be understood that either salt or feed may be placed in the box or trough with the same advantage and operation.

Having thus described the invention, what is claimed as new is—

In a device of the character set forth, the combination of uprights supporting a cover or roof, lower sills to which said uprights are secured, a box or trough pivotally mounted between the said uprights and adapted to move under the said cover and having ears projecting rearwardly therefrom, operating beams pivotally connected to the said sills, a platform on the operating beams, links connected to the rear of the operating beams and the lower front portion of the trough or box, and springs attached to the rear of the trough or box and to said projecting ears, substantially as and for the purposes specified.

CHRISTOPHER M. ARTHUR.

Witnesses:
  WM. SMITH,
  E. M. ASHFORD.